(12) United States Patent
Mikawa (10) Patent No.: US 11,467,630 B2
(45) Date of Patent: Oct. 11, 2022

(54) INFORMATION DISPLAY DEVICE

(71) Applicant: Akihisa Mikawa, Kanagawa (JP)

(72) Inventor: Akihisa Mikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/099,910

(22) Filed: Nov. 17, 2020

(65) Prior Publication Data

US 2021/0149447 A1  May 20, 2021

(30) Foreign Application Priority Data

Nov. 19, 2019 (JP) .............................. JP2019-209075
Nov. 13, 2020 (JP) .............................. JP2020-189327

(51) Int. Cl.
G06F 1/16 (2006.01)

(52) U.S. Cl.
CPC .... *G06F 1/1637* (2013.01); *G06F 2200/1612* (2013.01)

(58) Field of Classification Search
CPC .............................. G06F 1/1626; G06F 1/1635
See application file for complete search history.

(56) References Cited

U.S. PATENT DOCUMENTS

| | | | | |
|---|---|---|---|---|
| 6,829,495 B2 * | 12/2004 | Lee | ..................... | H04M 1/0262 379/433.08 |
| 8,121,640 B2 * | 2/2012 | Russ | ..................... | G06F 3/0484 345/173 |
| 10,860,274 B2 * | 12/2020 | Son | ........................ | G06F 1/1601 |
| 10,871,800 B2 * | 12/2020 | Virodov | .................. | G06F 3/147 |
| 11,101,676 B1 * | 8/2021 | Shalaby | ............. | H04N 21/4436 |
| 11,114,744 B2 * | 9/2021 | Park | ....................... | G06F 1/1626 |
| 2005/0114553 A1 * | 5/2005 | Lada | ....................... | G06F 1/1632 710/1 |
| 2006/0077067 A1 * | 4/2006 | Chong | .................. | G06F 1/3203 340/815.4 |
| 2010/0086840 A1 * | 4/2010 | Shao | .................... | H01M 50/209 429/97 |
| 2010/0240390 A1 * | 9/2010 | Russ | .................... | H04M 1/0256 345/173 |
| 2011/0122085 A1 * | 5/2011 | Chang | ................... | G06F 3/0416 345/174 |
| 2012/0060089 A1 * | 3/2012 | Heo | ..................... | G06F 3/04883 715/702 |
| 2012/0139939 A1 * | 6/2012 | Russ | ..................... | G06F 3/0485 345/173 |

(Continued)

FOREIGN PATENT DOCUMENTS

JP        2003-029872         1/2003
JP        2012185297 A   *   9/2012

*Primary Examiner* — Adrian S Wilson
(74) *Attorney, Agent, or Firm* — IPUSA, PLLC (57) ABSTRACT

An information display device including an information display part including a screen for displaying information, and a housing including a plurality of sides surrounding the screen, the information display part being attached to the information display device, wherein the housing has one side from among the plurality of sides, the one side being provided with an operation unit that receives an operation for the information display device, a connector that communicates with an external device, and a power source connecting portion that has a power source connector, to which power is supplied from an outside.

7 Claims, 11 Drawing Sheets

(56) References Cited

U.S. PATENT DOCUMENTS

| | | | | |
|---|---|---|---|---|
| 2013/0083467 A1* | 4/2013 | Becze | ............... | G06T 3/40 |
| | | | | 361/679.27 |
| 2014/0344706 A1* | 11/2014 | Russ | ............... | G06F 1/1615 |
| | | | | 715/744 |
| 2014/0375530 A1* | 12/2014 | Delaporte | ............ | G06F 1/1652 |
| | | | | 345/1.3 |
| 2015/0160693 A1* | 6/2015 | Stotler | .............. | H04M 1/72439 |
| | | | | 345/173 |
| 2015/0192960 A1* | 7/2015 | Sharma | ................ | G06F 1/1654 |
| | | | | 345/2.2 |
| 2015/0243202 A1* | 8/2015 | Lombardi | ............ | G06F 3/1423 |
| | | | | 345/520 |
| 2016/0103648 A1* | 4/2016 | Reeves | ................ | G06F 1/1647 |
| | | | | 345/173 |
| 2019/0004764 A1* | 1/2019 | Son | ...................... | G06F 1/1654 |
| 2019/0364185 A1* | 11/2019 | Bai | ..................... | H04M 1/0225 |
| 2020/0401263 A1* | 12/2020 | Chung | .................. | G06F 3/147 |
| 2021/0153364 A1* | 5/2021 | Kosukegawa | ....... | H05K 5/0017 |
| 2021/0153365 A1* | 5/2021 | Mikawa | ................ | G06F 1/1637 |
| 2021/0232180 A1* | 7/2021 | Pakula | ....................... | G06F 1/26 |
| 2021/0271363 A9* | 9/2021 | Zadesky | ............. | G06F 3/04847 |

* cited by examiner

INFORMATION DISPLAY DEVICE

CROSS-REFERENCE TO RELATED APPLICATIONS

The present application claims priority under 35 U.S.C. § 119 to Japanese Patent Application No. 2019-209075, filed Nov. 19, 2019 and Japanese Patent Application No. 2020-189327, filed Nov. 13, 2020, the contents of which are incorporated herein by reference in their entirety.

BACKGROUND OF THE INVENTION

Field of the Invention

The present invention relates to an information display device.

Description of the Related Art

Known is a display device that uses a flat panel display and is portable so as to be freely carried. Japanese Laid-Open Patent Application No. 2003-029872 discloses a portable information terminal device that is multi-functional and has improved usability while maintaining a reduction in size and weight.

SUMMARY OF THE INVENTION

In a background art, such as a technique disclosed in Japanese Laid-Open Patent Application No. 2003-029872, an operation button is provided on the same surface as a display surface, a connector is provided on a side, and an interface with a user is provided in a plurality of locations. As a result, the location of a desired interface becomes difficult for the user to understand. The present invention is intended to facilitate the user to recognize the location of the interface and to improve operability.

The disclosed technique is an information display device including an information display part including a screen for displaying information, and a housing including a plurality of sides surrounding the screen, the information display part being attached to the information display device, wherein the housing has one side from among the plurality of sides, the one side being provided with an operation unit that receives an operation for the information display device, a connector that communicates with an external device, and a power source connecting portion that has a power source connector, to which power is supplied from an outside.

DESCRIPTION OF THE EMBODIMENTS

Hereinafter, an embodiment for carrying out the present invention will be described with reference to the drawings. In the present specification and the drawings, a component having substantially the same functional structure is denoted by the same reference numeral, and the description thereof is not repeated. Also, for ease of understanding, the reduction scale of each part in the drawings may differ from an actual reduction scale. Directions such as parallel, right-angled, orthogonal, horizontal, vertical, up and down, and left and right are allowed to deviate without spoiling the effect of the embodiment.

The shape of a corner is not limited to a right angle and may be rounded like an arch. Parallel, right-angled, orthogonal, horizontal, and vertical may include substantially parallel, substantially right-angled, substantially orthogonal, substantially horizontal, and substantially vertical.

Information Display Device 100

Figure 1:
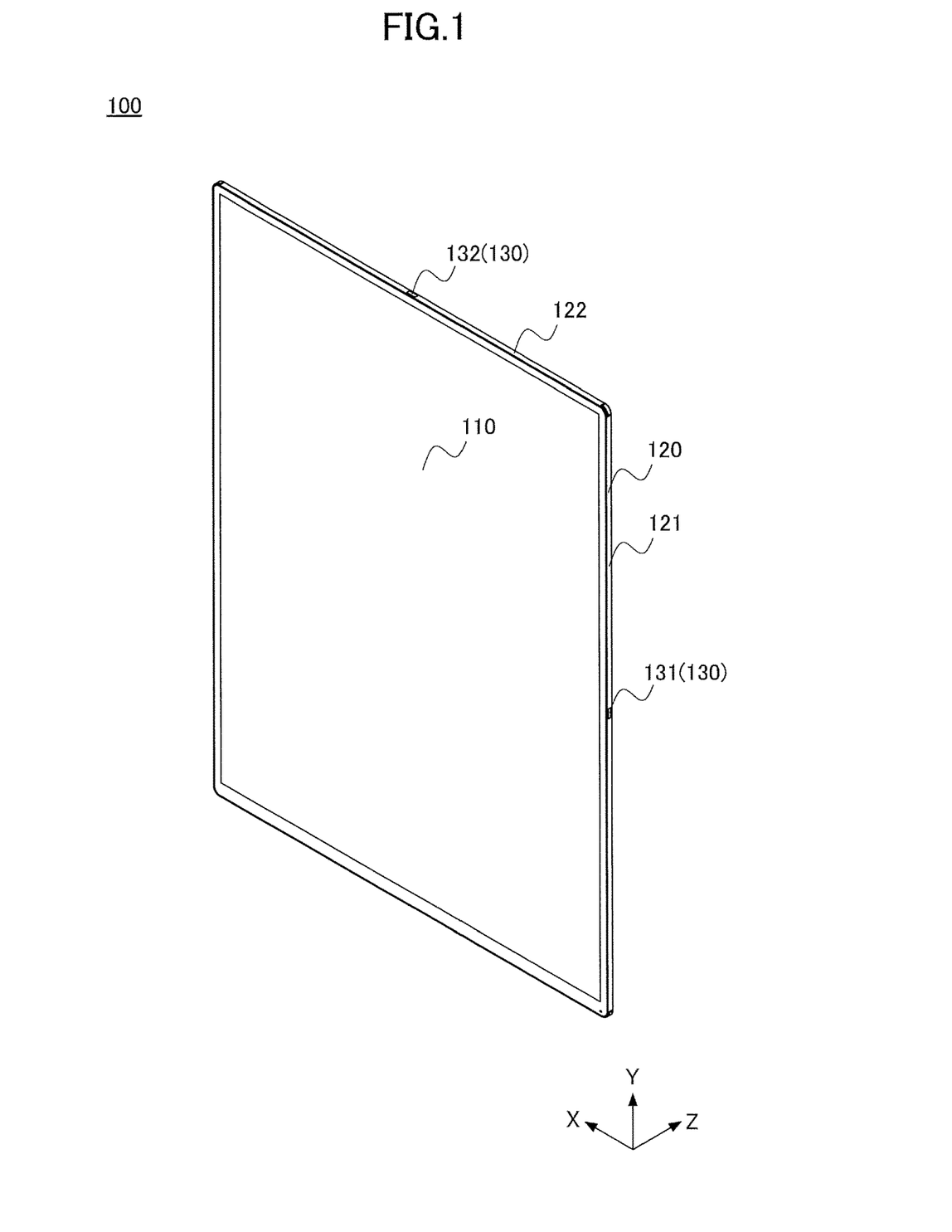
FIG. 1 is a perspective view of the information display device according to the present embodiment.
Figure 2:
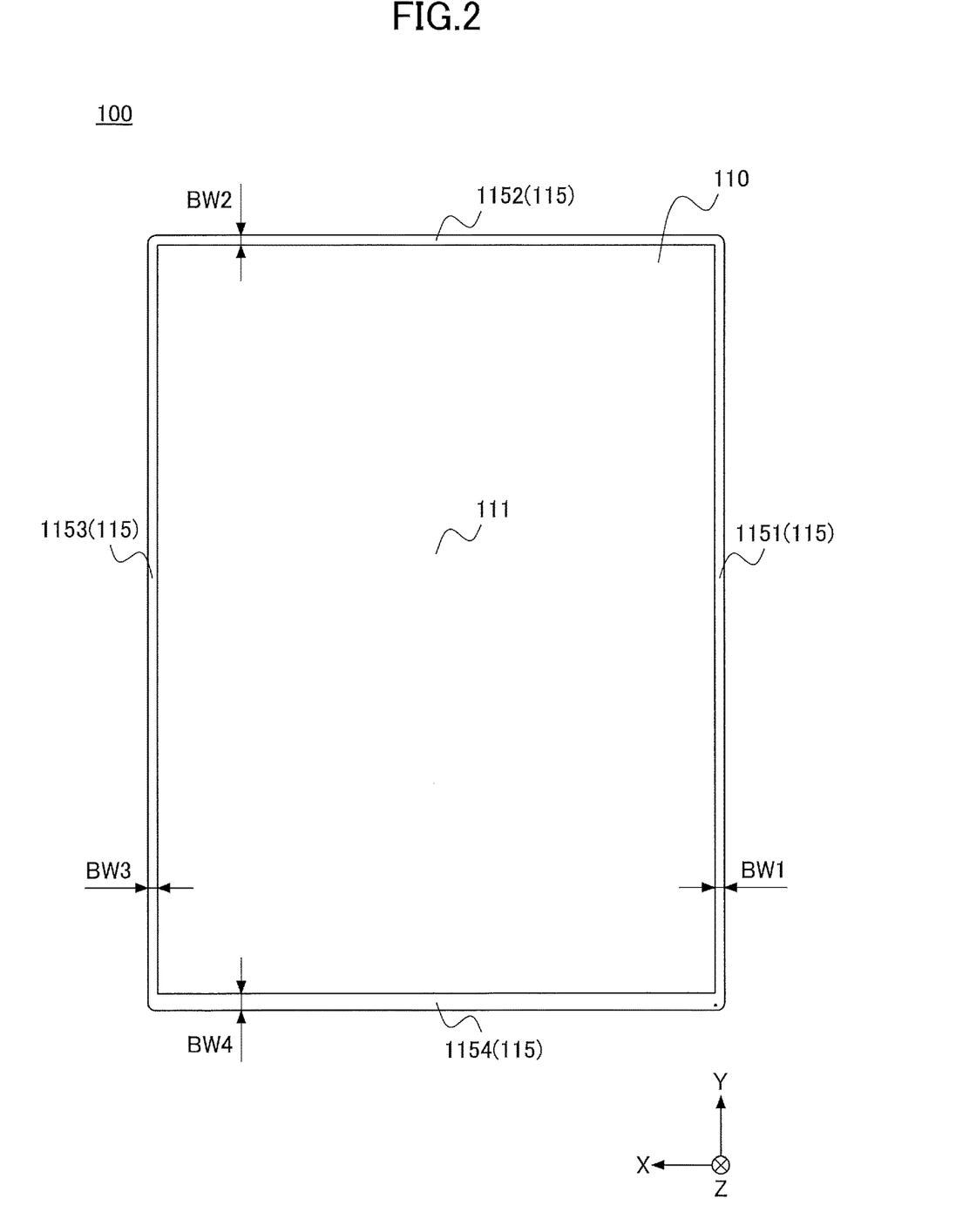
FIG. 2 is a front view of the information display device according to this embodiment.
Figure 3:
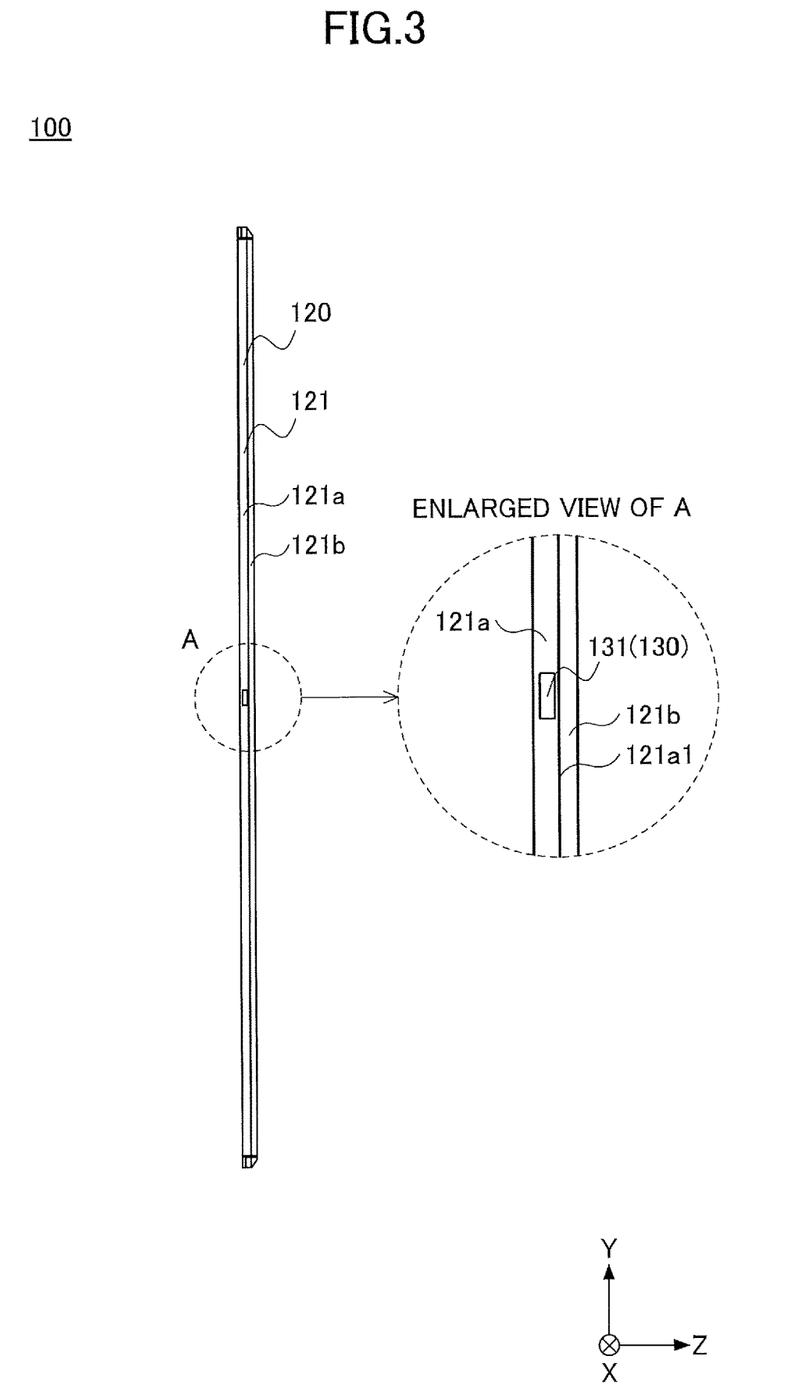
FIG. 3 is a right side view of the information display device according to the present embodiment.
Figure 4:
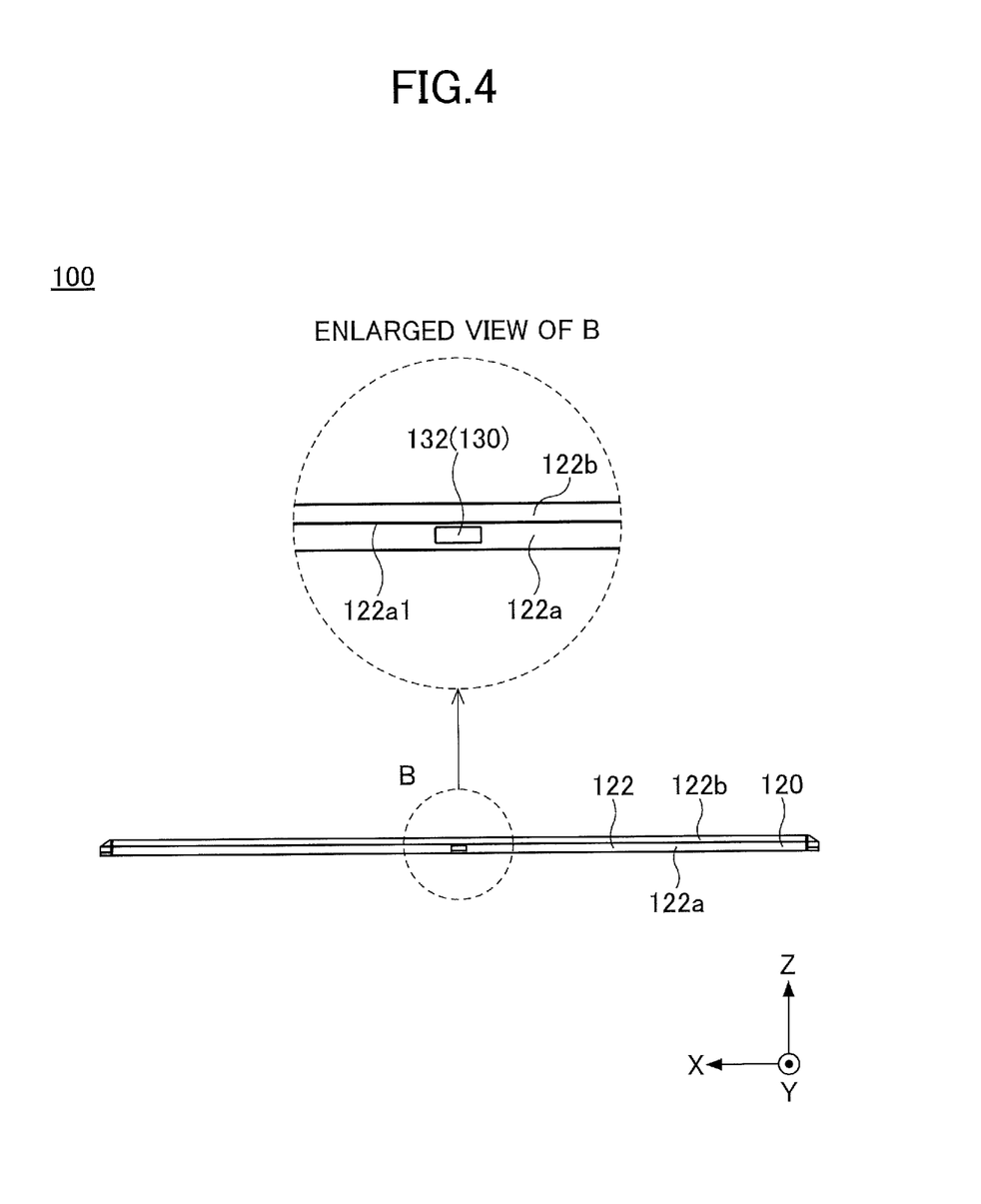
FIG. 4 is a top view of an information display device according to this embodiment.
Figure 5:
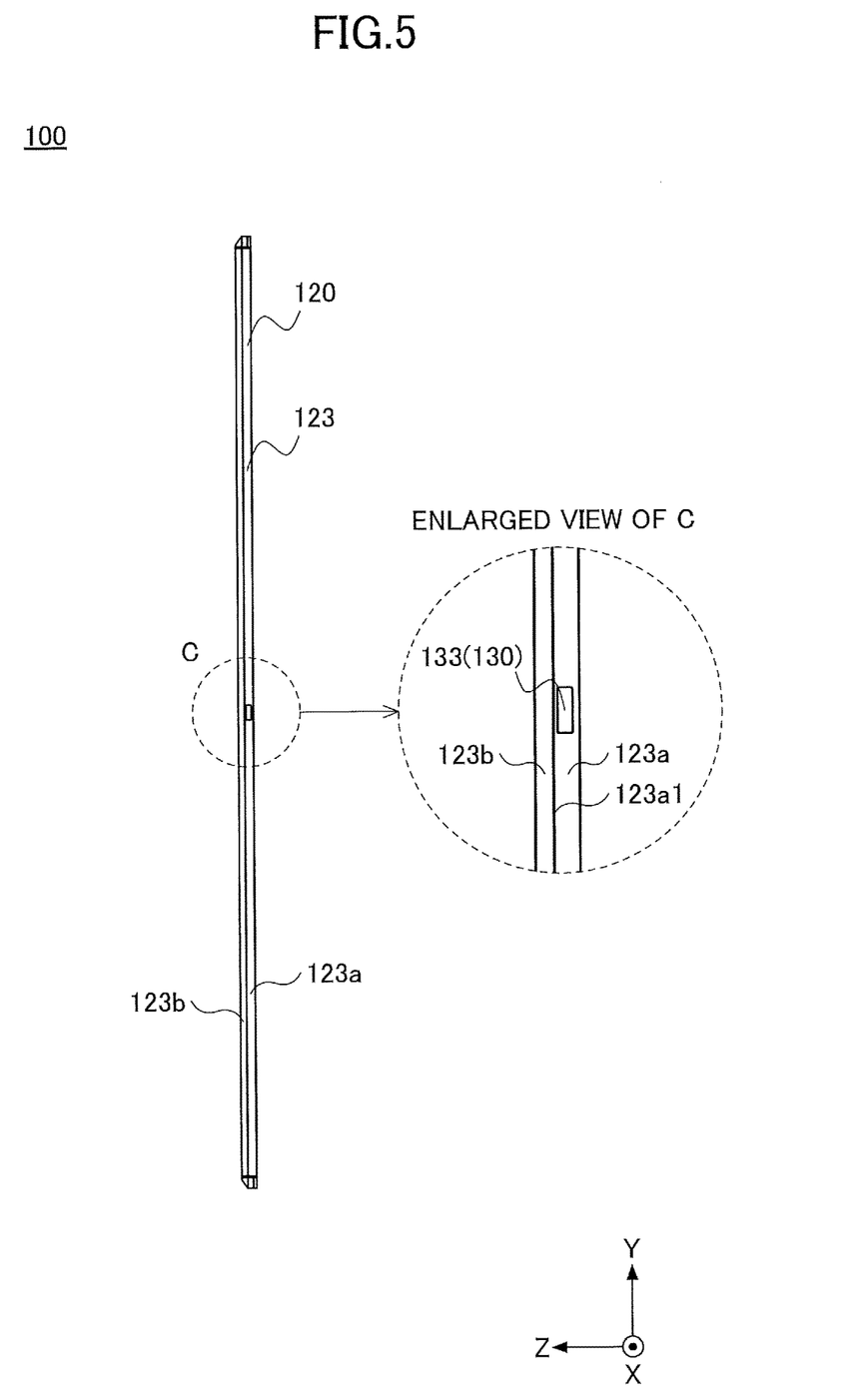
FIG. 5 is a left side view of the information display apparatus according to this embodiment.
Figure 6:
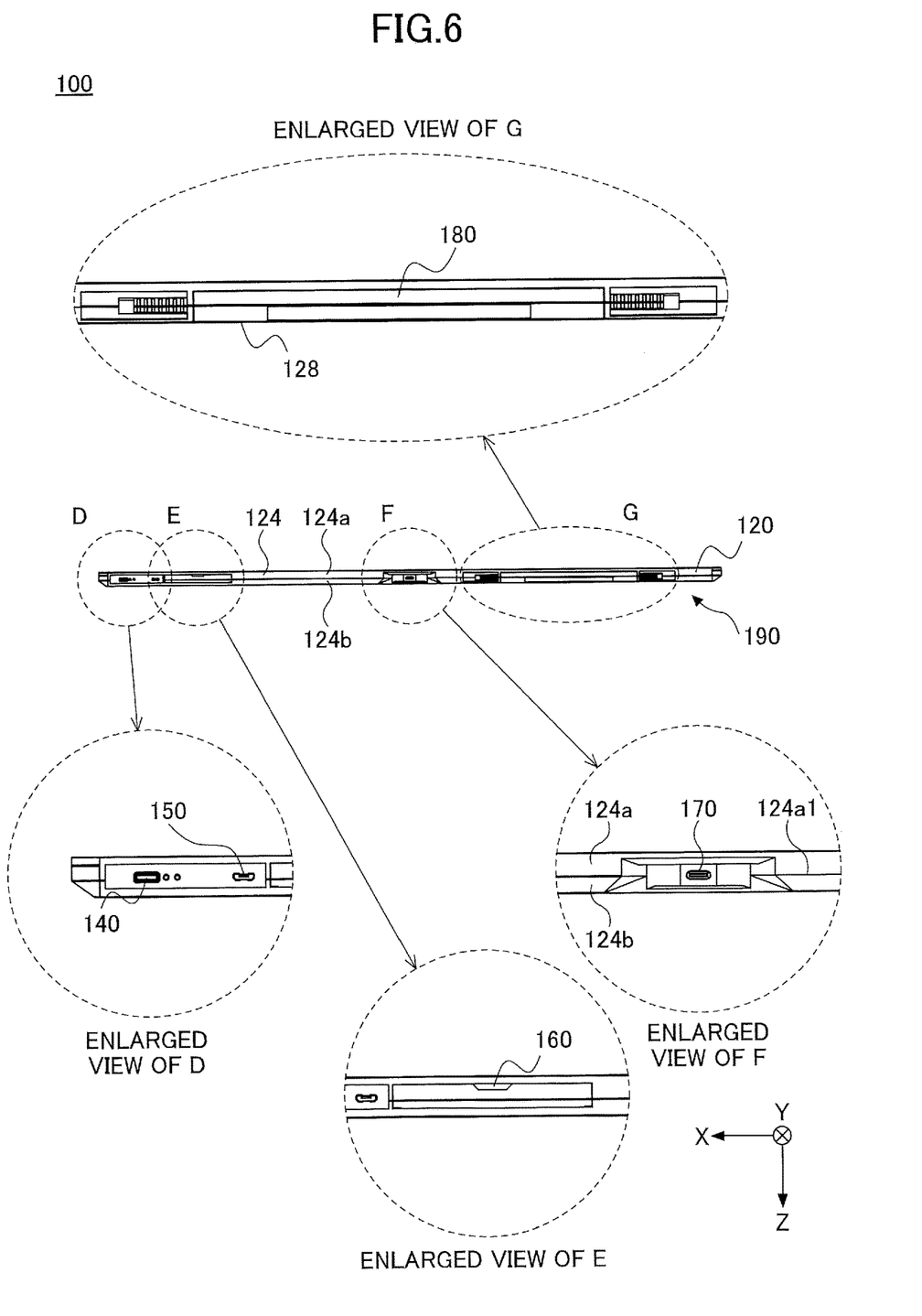
FIG. 6 is a bottom view of an information display device according to this embodiment.
Figure 7:
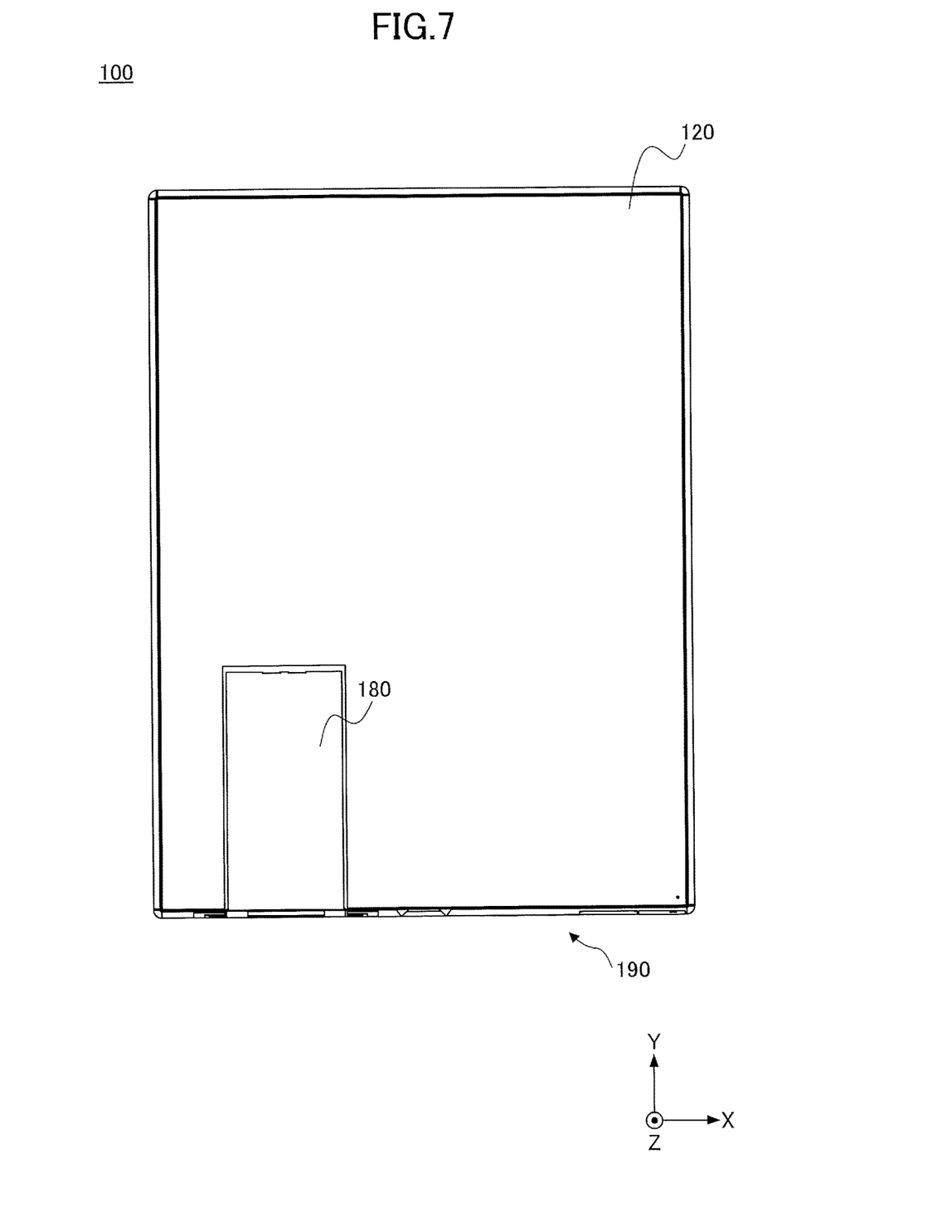
FIG. 7 is a back view of the information display apparatus according to the present embodiment.

FIG. 1 is a perspective view of the information display device 100 according to the present embodiment. FIG. 2 is a front view of the information display device 100 according to the present embodiment. FIG. 3 is a right side view of the information display device 100 according to the present embodiment. FIG. 4 is a top view of the information display device 100 according to the present embodiment. FIG. 5 is a left side view of the information display device 100 according to the present embodiment. FIG. 6 is a bottom view of the information display device 100 according to the present embodiment. FIG. 7 is a back view of the information display device 100 according to the present embodiment.

For the sake of explanatory convenience, a virtual three-dimensional coordinate system (XYZ orthogonal coordinate system) consisting of X, Y, and Z axes (XYZ axes) mutually orthogonal may be set. However, the coordinate system is provided for the purpose of explanation and does not limit the attitude of the information display device 100 or the like. In the present disclosure, unless otherwise explained, the X axis direction is a direction parallel to the screen 111 of the information display device 100 and is a short direction of the screen 111. The Y axis direction is a direction parallel to the screen 111 of the information display device 100 and is a longitudinal direction of the screen 111. In other words, the XY plane parallel to the X axis direction and the Y axis direction is a plane parallel to the screen 111 of the information display device 100. The Z axis shall be in a direction perpendicular to the X axis and Y axis. In other words, the YZ plane parallel to the Y axis direction and the Z axis direction is a plane perpendicular to the screen 111 of the information display device 100. Similarly, the ZX plane parallel to the X axis direction and Z axis direction is a plane perpendicular to the screen 111 of the information display device 100. In some cases, the X axis direction may be denoted the left-right directions, the Y axis direction is denoted top-bottom directions, and the Z axis direction is denoted a thickness direction. In addition, the +X side may be denoted a left side, −X side may be denoted a right side, +Y side may be denoted a top side, −Y side may be denoted a bottom side, and +Z side may be denoted a back side, and −Z side may be denoted a front side. Meanwhile, viewing of the information display device 100 from the −Z side may be expressed as viewing from front. Further, viewing of the information display device 100 from the +Z side may be expressed as viewing from back. The information display device 100 includes an information display part 110 and a housing 120.

The information display device 100 displays a screen, such as a PC (Personal Computer). Further, by using a dedicated pen-type input device, characters or graphics can be written freely on the information display part 110. Further, one feature of the information display device 100 according to the present embodiment is that the thickness is thin as illustrated in FIGS. 1 to 6. The information display device 100 of this embodiment is designed thin and lightly to produce a portable display product even when a large inch number of displays is used. Another feature of the information display device 100 according to the present embodiment is that the back surface is completely flat, as illustrated in FIGS. 3 to 6.

Therefore, for example, the information display device 100 can be positioned flat on a desk, and the information display device 100 can be surrounded by a plurality of persons for a discussion. Further, the information display device 100 can correspond to inputs made by a plurality of pen-type input devices so that the information display device 100 can be written by a plurality of persons at the same time. Further, both the main body of the information display device 100 and the pen-type input device are dustproof and waterproof so that the information display device 100 can be used outdoors.

Information Display Part 110

The information display part 110 is a device for displaying information on the screen. The information display part 110 is a so-called flat panel display, such as an electronic paper, a liquid crystal display, or an organic EL (Electroluminescence) display. The information display part 110 includes a screen 111 that is formed by pixels and performs display and a frame portion 115 positioned at the periphery of the screen. The screen 111 is parallel to the XY plane of the XYZ orthogonal coordinate system. The frame portion 115 forms a so-called screen frame, i.e., a bezel. Display is not done in the frame portion 115. In the front view of FIG. 2, the frame portion 115 includes a right side frame portion 1151, an top side frame portion 1152, a left side frame portion 1153, and a bottom side frame portion 1154 on the right side of the screen 111.

The width of each frame portion (bezel width), that is, the width from the border of each frame portion and the border of the screen 111 to the outside of each frame portion will be described. The bezel widths of the right side frame portion 1151, the top side frame portion 1152, and the left side frame portion 1153 are the same width as each other. That is, the bezel width BW1 of the right side frame portion 1151, the bezel width BW2 of the top side frame portion 1152, and the bezel width BW3 of the left side frame portion 1153 are equal to each other. The bezel width of the bottom side frame portion 1154 is wider than the bezel width of the right side frame portion 1151, the top side frame portion 1152, and the left side frame portion 1153. That is, the bezel width of the bottom side frame portion 1154 is the widest of the frame portion. In other words, the bezel width BW4 of the bottom side frame portion 1154 is larger than the bezel width BW1 of the right side frame portion 1151, the bezel width BW2 of the top side frame portion 1152, and the bezel width BW3 of the left side frame portion 1153. This makes it easier to recognize the direction of the information display device 100 when viewed from the front.

Incidentally, in the description of the present disclosure, each element of the information display device 100 is specified by using the right side, the left side, the top side, the bottom side, or the like from the front side, but these are for the purpose of explanation and not limiting the attitude of the information display device 100. For example, the information display device 100 may be installed in a horizontal plane, or the information display device 100 may be installed such that the bottom side frame portion 1154 is on the top, left, or right side. The same applies to the following description.

Housing 120

The shape of the housing 120 is substantially a rectangle. The information display part 110 is installed on the front side of the housing 120. The housing 120 holds the information display part 110 and a circuit or the like for driving the information display part 110. The housing 120 has the right side surface 121, top side surface 122, left side surface 123, and bottom side surface 124 relative to the front side. That is, the right side surface 121, the top side surface 122, the left side surface 123, and the bottom side surface 124 are a plurality of side surfaces surrounding the screen 111 of the information display part 110. In other words, the housing 120 includes a plurality of sides surrounding the screen 111. The right side surface 121 is positioned on the right side of the screen 111. The right side surface 121 has a vertical side surface 121a perpendicular to the screen 111 and a sloped side surface 121b inclined relative to the direction perpendicular to the screen 111.

The vertical side surface 121a is a plane parallel to the YZ plane. The sloped side surface 121b is a plane that is inclined from the sloped side surface 121b of the vertical side surface 121a to the left, the direction of which is determined when viewed from the front, with respect to the YZ plane. The top side surface 122 is positioned above the screen 111. The top side surface 122 has a vertical side surface 122a perpendicular to the screen 111 and a sloped side surface 122b inclined relative to the screen 111. The vertical side surface 122a is a plane parallel to the ZX plane. The sloped side surface 122b is a plane that inclines downwardly from the back surface side end 122a1 of the vertical side surface 122a relative to the ZX plane.

The left side surface 123 is positioned on the left side of the screen 111. The left side surface 123 has a vertical side surface 123a perpendicular to the screen 111 and the sloped side surface 123b inclined relative to the vertical direction of the screen 111. The vertical side surface 123a is a plane parallel to the YZ plane. The sloped side surface 123b is a plane that is inclined to the right side from the back surface side end 123a1 of the vertical side surface 123a from the front relative to the YZ plane. The bottom side surface 124 is located below the screen 111. The bottom side surface 124 has a vertical side surface 124a perpendicular to the screen 111 and the sloped side surface 124b inclined relative to the vertical direction of the screen 111.

The vertical side surface 124a is a plane parallel to the ZX plane. The sloped side surface 124b is a plane that inclines upwardly with respect to the ZX plane from the back end 124a1 of the vertical side surface 124a. The information display device 100 according to the present embodiment includes a plurality of infrared sensors for transmitting and receiving information with the neighboring information display device 100. The right side surface 121 of the housing 120 has an infrared sensor window 131 on the vertical side surface 121a. The top side surface 122 has an infrared sensor window 132 on the vertical side surface 122a. The left side surface 123 has an infrared sensor window 133 on the vertical side surface 123a. The infrared sensor transmits and receives infrared signals through the infrared sensor windows 131, 132 and 133. The infrared sensor windows 131, 132, and 133 are collectively referred to as an infrared sensor window 130.

The housing 120 includes a power button 140, a communication connector 150, a card connector cover 160, and a power source connector 170 on the bottom side surface 124. The power button 140 is operated by a user when a power on/off operation of the information display device 100 is performed. In other words, the power button 140 receives an operation (power on/off operation) in the information display device 100.

The power button 140 is a member that is touched by the user when the user turns the information display device 100 on and off. The power button 140 is an example of an operation unit that is operated by the user when the operation of the information display device 100 is performed. The information display device 100 according to the present embodiment includes at least a power button 140 in an operation unit. The operation unit may include a button for operating the information display device 100 in addition to the power button 140. For example, an operation unit may include a menu button for displaying a menu on the screen, a cursor movement button for selecting a menu, a confirmation button, or the like. That is, the operating unit receives various operations on the information display device 100. The communication connector 150 is a data communication unit that connects an external device such as a PC or a USB (Universal Serial Bus) flash memory to communicate data.

Inside of the card connector cover 160 is a connector that connects cards such as SD (Secure Digital) cards and SIM (Subscriber Identity Module) cards. A power cable is inserted into the power source connector 170. An external power source connector is connected to the power source connector 170. The power source connector 170 is supplied from an external source. The power source connector 170 constitutes a power connection. The power button 140, the communication connector 150, the connector inside the card connector cover 160, and the power source connector 170 are sometimes collectively referred to as the interface portion 190. The housing 120 also includes a battery insertion portion 128 into which the battery 180 is inserted on the bottom side surface 124.

The information display device 100 according to the present embodiment also supports a battery drive. The battery 180 has an attachable and detachable structure rather than a built-in structure. Specifically, the battery 180 is attachable and detachable in a direction perpendicular to the bottom side surface 124 from and to the battery insertion portion 128. The information display device 100 of this embodiment aggregates and disposes the interface portion 190 and an inserted portion of the battery 180 on the bottom side surface 124 of the housing 120 adjacent to the bottom side frame portion 1154 which has a wide bezel width relative to the other frame portion 115. The interface portion 190 and an inserted portion for the battery 180 which may be operated by the user in using the information display device 100 are aggregated and disposed on the bottom side surface 124. The bottom side surface 124 is one example of one side from among the plurality of sides.

Status of Use of the Information Display Device 100

Figure 8:
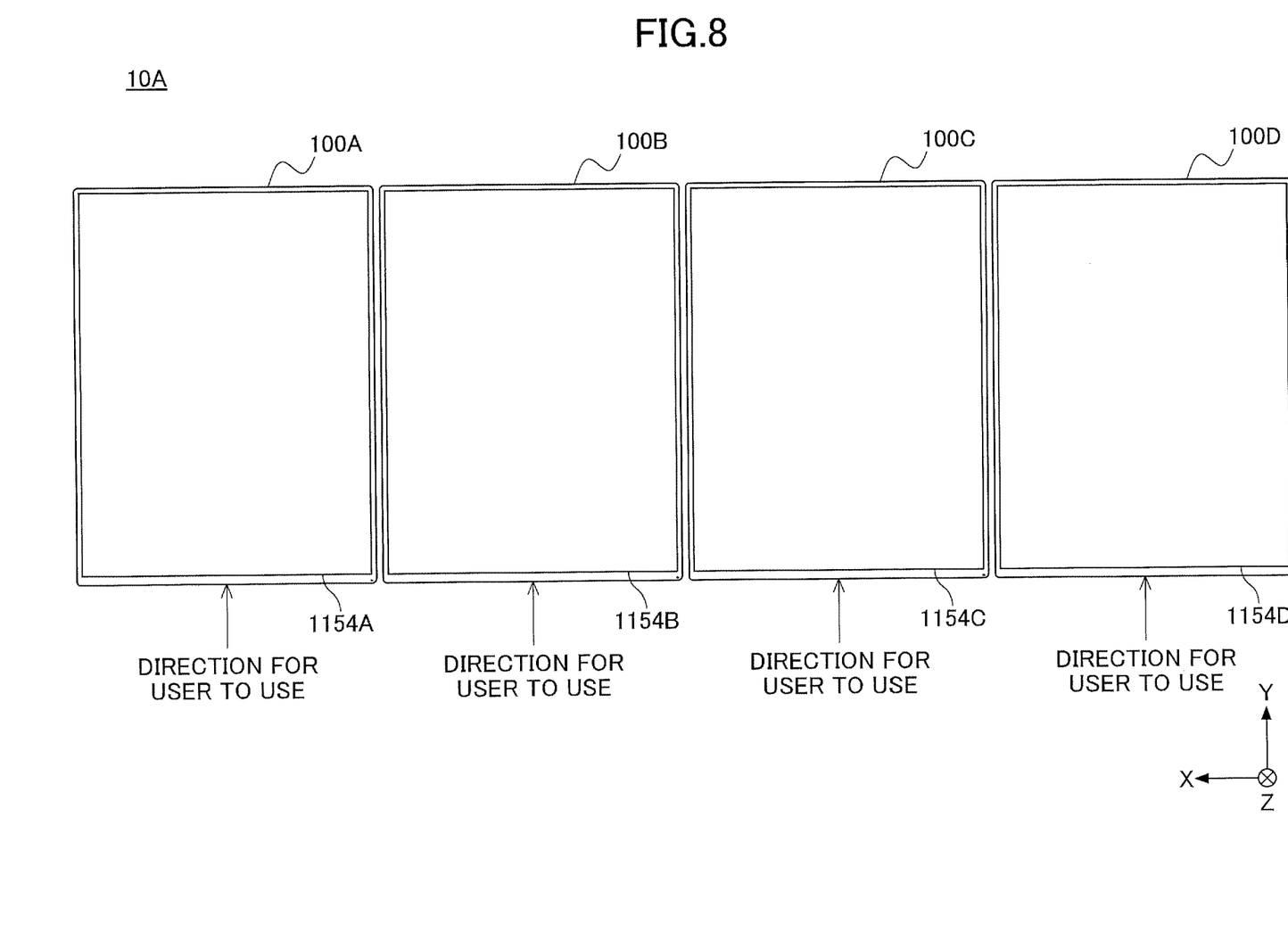
FIG. 8 is a view illustrating a state of use of the information display device according to this embodiment.
Figure 9:
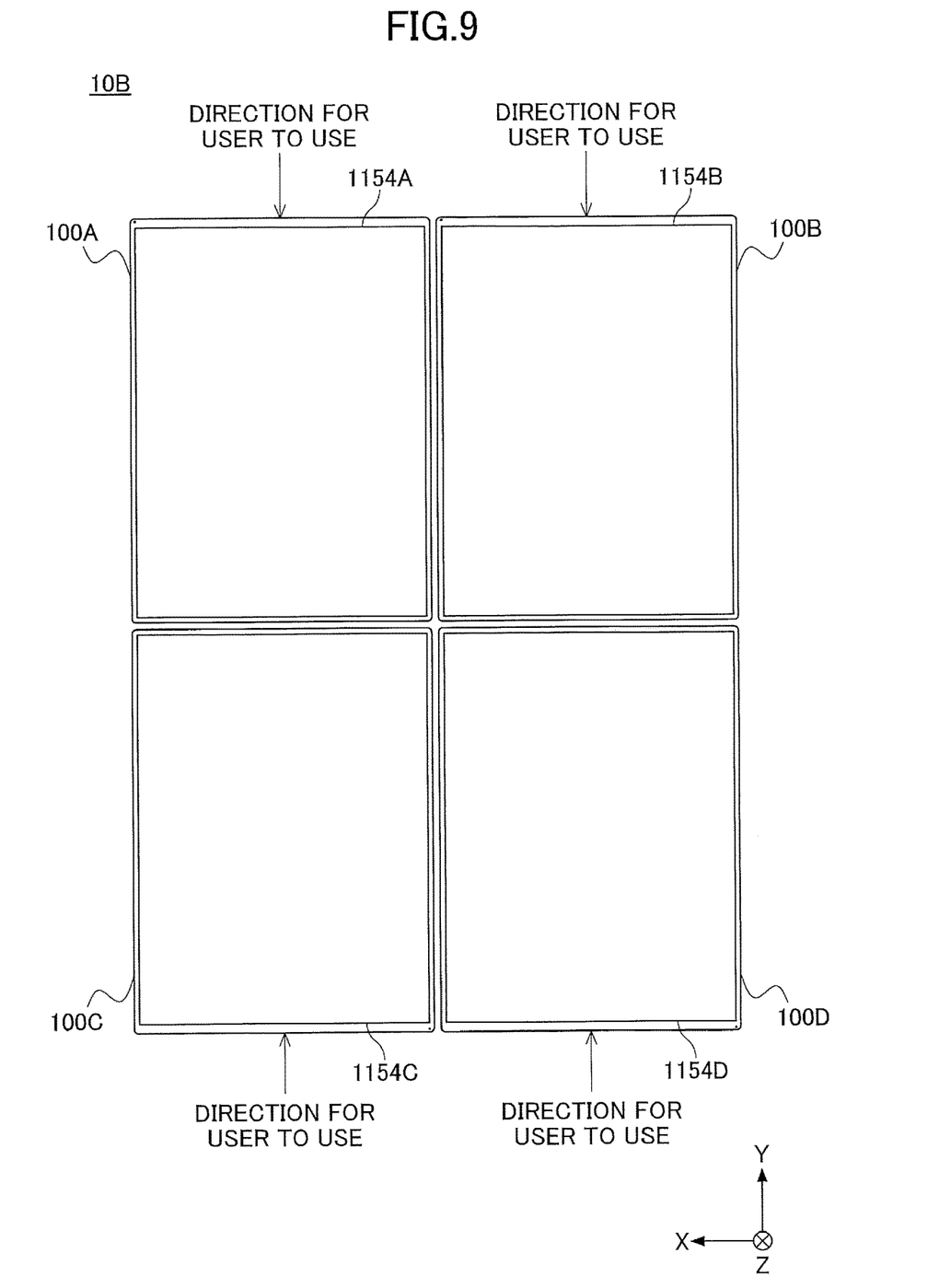
FIG. 9 is a view illustrating the state of use of the information display device according to this embodiment.
Figure 10:
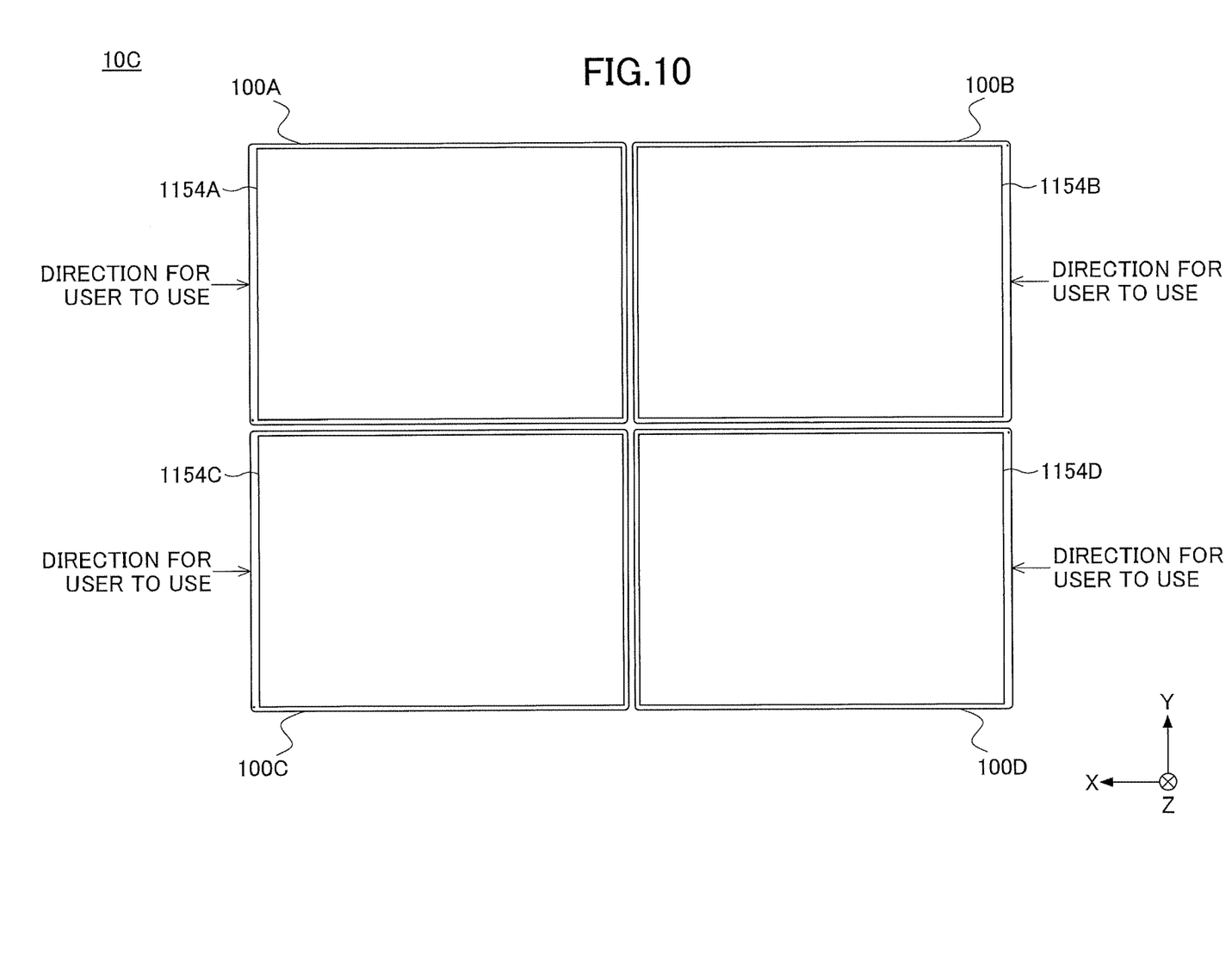
FIG. 10 is a view illustrating the state of use of the information display device according to this embodiment.

FIGS. 8 to 10 are diagrams illustrating the state of use of the information display device according to the present embodiment. FIG. 8 illustrates a state in which four information display devices 100 (100A, 100B, 100C, and 100D), each disposed in an upright state, are arranged side-by-side. Incidentally, the four information display devices 100 arranged as illustrated in FIG. 8 are collectively referred to as the information display system 10A. In the information display system 10A, the information display device 100A, the information display device 100B, the information display device 100C, and the information display device 100D are arranged in order from the left side to the right side in FIG. 8. Further, the information display device 100A, the information display device 100B, the information display device 100C, and the information display device 100D are disposed below the bottom side frame portion 1154A, the bottom side frame portion 1154B, the bottom side frame portion 1154C, and the bottom side frame portion 1154D, respectively, in FIG. 8 of the information display device.

In the information display system 10A, from the user's usage direction illustrated in FIG. 8, the user can operate the interface portion 190 of the information display device 100A, the information display device 100B, the information display device 100C, and the information display device 100D. The user can operate the interface portions 190 of the information display device 100A, the information display device 100B, the information display device 100C, and the information display device 100D by approaching the interface portion 190 from the bottom to the top in FIG. 8.

FIG. 9 illustrates a state in which four information display devices 100 (100A, 100B, 100C, and 100D), each disposed in the up-right state, are connected in two (2) rows by two (2) row. Incidentally, as illustrated in FIG. 9, the four information display devices 100 arranged in a row are collectively referred to as the information display system 10B. In the information display system 10B, the information display device 100A and the information display device 100B are arranged in order from the left side to the right side in FIG. 9.

Further, in the information display system 10B, the information display device 100C and the information display device 100D are sequentially disposed below the information display device 100A and the information display device 100B in the order from the left side to the right side. The bottom side frame portion 1154A and the bottom side frame portion 1154B of each of the information display device 100A and the information display device 100B are disposed on the upper side of the respective information display device in FIG. 9. The bottom side frame portion 1154C and the bottom side frame portion 1154D respectively of the information display device 100C and the information display device 100D are disposed on the lower side of the respective information display devices in FIG. 9.

In the information display system 10B, from the user's usage direction illustrated in FIG. 9, the user can operate the interface portions 190 of the information display device 100A and the information display device 100B, the information display device 100C, and the information display device 100D. The user can operate the interface portions 190 respectively of the information display device 100A and the information display device 100B by approaching the interface portion 190 downwardly from the upper side to the top in FIG. 9. Further, in FIG. 9, the user can operate the interface portions 190 respectively of the information display device 100C and the information display device 100D by approaching the interface portion 190 upwardly from the bottom in FIG. 9.

FIG. 10 illustrates a state in which four information display devices 100 (100A, 100B, 100C, and 100D) are connected in two rows by two rows, respectively, in a landscape state. The four information display devices 100 disposed in a manner as illustrated in FIG. 10 may be collectively referred to as the information display system 10C. In the information display system 10C, the information display device 100A and the information display device 100B are rightwardly arranged in order from the left in FIG. 10.

Further, in the information display system 10C, the information display device 100C and the information display device 100D are sequentially arranged below the information display device 100A and the information display device 100B from the left to the right in FIG. 10.

The bottom side frame portion 1154A and the bottom side frame portion 1154C respectively of the information display device 100A and the information display device 100C are disposed on the left of each of the information display devices in FIG. 10.

Further, the bottom side frame portion 1154B and the bottom side frame portion 1154D of the information display device 100B and the information display device 100D are disposed on the right of each of the information display devices in FIG. 10.

In the information display system 100, from the user's usage direction illustrated in FIG. 10, the user can operate the interface portion 190 of the information display device 100A, the information display device 100B, the information display device 100C, and the information display device 100D. The user can operate the interface portions 190 respectively of the information display device 100A and the information display device 100C by approaching the interface portion 190 from the left to the right in FIG. 10. The user can operate the interface portion 190 of each of the information display device 100B and the information display device 100D by approaching the interface portion 190 leftwardly from the right in FIG. 10. Generally, when a plurality of displays are connected, it is more preferable that the bezel width of the frame portion 115 is narrower.

Therefore, the information display systems 10A, 10B, and 10C according to the present embodiment are mutually coupled so that the right side frame portion 1151, the top side frame portion 1152, and the left side frame portion 1153 of each information display device 100 having the narrow bezel width of the frame portion 115 are adjacent to one another. In the information display device 100 according to this embodiment, the right side frame portion 1151, the top side frame portion 1152, and the left side frame portion 1153, which have narrower bezel width than that of the bottom side frame portion 1154, are configured to be actively utilized at the time of coupling. The left side surface 123 on the right side frame portion 1151, the top side surface 122 of the top side frame portion 1152, and the right side surface 121 of the left side frame portion 1153, each having a narrow bezel width of the frame portion 115 of the housing 120, have the infrared sensor window 130 formed near the center of each side. An infrared transmission sensor and an infrared reception sensor are installed inside the infrared sensor window.

Accordingly, a structure capable of detecting whether there is a neighboring information display device 100 is provided. On the other hand, the infrared sensor window 130 is not formed in the bottom side frame portion 1154 where the bezel width of the frame portion 115 is larger than the bezel width of the other frame portion.

The information display device 100 according to this embodiment is configured such that the bottom side frame portion 1154 cannot be coupled to the system even though it is brought into proximity to another display. In the information display device 100 according to the present embodiment, the screen coupling cannot be made on the bottom side frame portion 1154 side. Therefore, the side of the bottom side frame portion 1154 is configured to face the outside when the screen is coupled. Another information display device 100 is not disposed on the bottom side frame portion 1154 of the information display device 100.

The interface portion 190 includes a power button 140, a communication connector 150, a connector inside a card connector cover 160, and a power source connector 170 on the bottom side surface 124 of housing 120 on the side of the bottom side frame portion 1154. Then, the bottom side surface 124 of the housing 120 on the side of the bottom side frame portion 1154 aggregates the above-described interface portion 190 so that the user can operate the interface portion 190 directly even when the interface portion 190 is installed in a screen coupled state.

Figure 11:
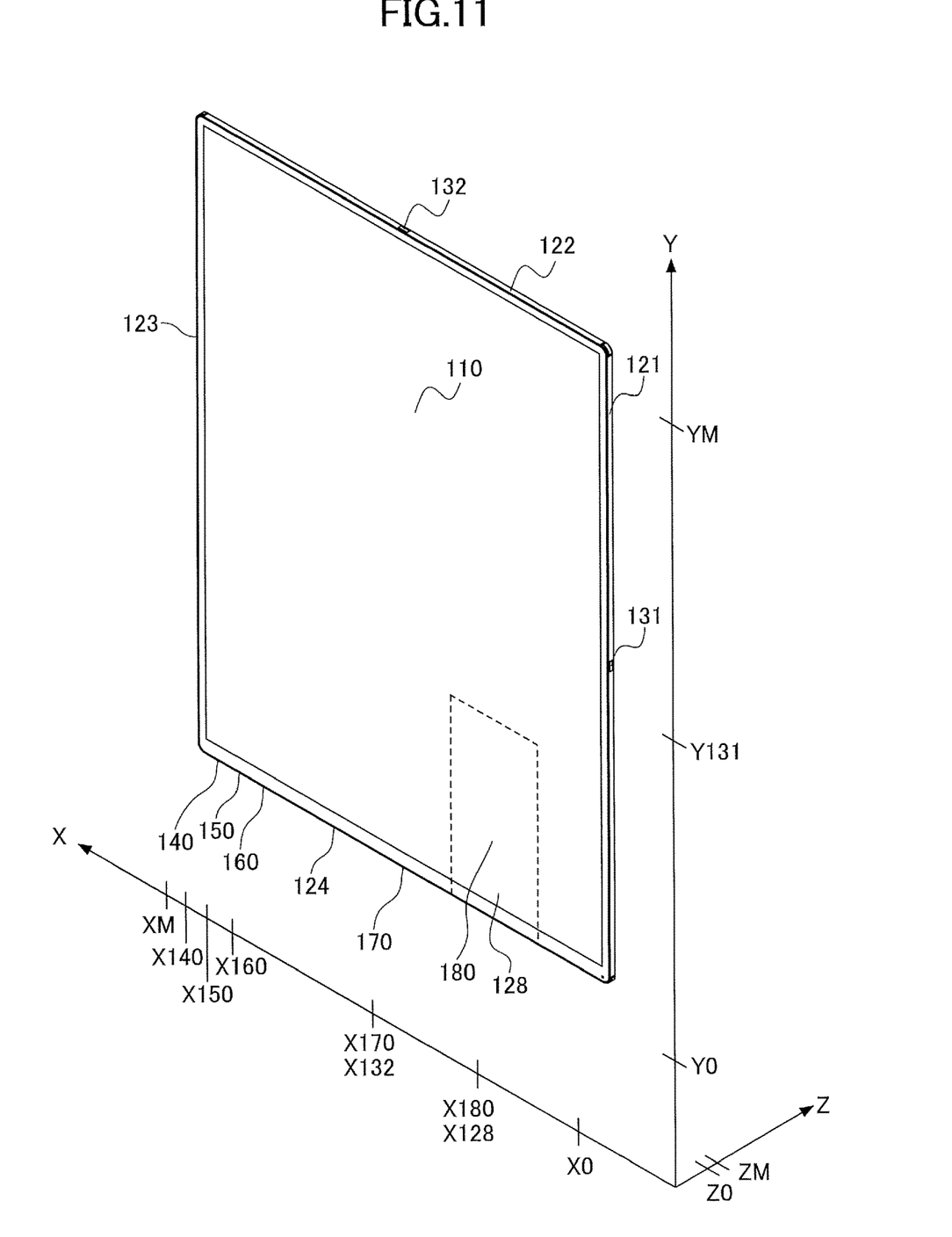
FIG. 11 is a perspective view of the information display device according to this embodiment.

FIG. 11 is a perspective view illustrating the information display device 100 according to the present embodiment. Specifically, FIG. 11 is a diagram illustrating the coordinates when the information display device 100 is disposed in a virtual three-dimensional coordinate system (XYZ orthogonal coordinate system). For example, the information display device 100 according to this embodiment is disposed in a range of the virtual three-dimensional coordinates X0 to XM, Y0 to YM, and Z0 to ZM. The right side surface 121 is provided is parallel to the YZ plane at X0. The top side surface 122 is provided is parallel to the ZX plane at YM. The left side surface 123 is provided is parallel to the YZ plane at XM. The bottom side surface is provided is parallel to the ZX plane at Y0.

The screen 111 of the information display part 110 is parallel to the XY plane at Z0. A power button 140 is provided on X140. A communication connector is provided in X150. A card connector cover 160 is provided on X160. A power source connector 170 is provided in X170. The center of the battery 180 in the X axis direction is provided in X180. The center of the X axis direction of the battery insertion portion 128 is provided at X128. The infrared sensor window 132 is also provided in X132. An infrared sensor window 131 is provided at Y131. In FIG. 12, the outer surface 185a of the battery housing 185, the back side surface 1281c of the outer wall portion 1281, and the back side surface 230a of the back plate 230 are substantially coplanar in the Z axis direction.

Effect

The information display device 100 according to the present embodiment aggregates the interface portions 190 on the side of the housing 120, particularly on the side which is directly operable by the user even when coupled.

The information display device 100 according to the present embodiment aggregates the interface portions 190 into a single location so that the position of the interface can be easily recognized, and the interface can be operated while the information display device 100 is being installed. In particular, when the information display device 100 is coupled, the position of the interface can be easily recognized, and the interface can be operated while the information display device 100 is installed. The information display device 100 according to the present embodiment includes the interface portion 190 including a power connection that is supplied to the side of the side of the housing 120.

Accordingly, when the installed surface of the information display device 100 (the back surface of the information display device 100) is mounted to a wall or placed on a desk, power source wiring can be provided without interfering with the surface of the wall or the desk.

For example, when a power source connector is provided on the back side of the information display device, construction is required to connect the power source to the information display device, such as installing the connector away from the wall or opening a hole in the wall.

The information display device 100 according to this embodiment is provided with a power source connector on the side surface as described above, so that the power source wiring can be provided without performing construction work or the like.

The power source wiring can be performed without performing construction or the like is particularly effective in the case where the information display device 100 according to the present embodiment is thin and portable. Further, the information display device 100 according to the present embodiment is provided on the side of the housing 120 with the operation unit including the power button 140, particularly on the side where the user can operate even when the information display devices 100 are connected. When the operation unit is disposed on the side of the housing 120, the installation surface of the information display device 100, for example, the back surface of the information display device 100, is installed onto the wall, the operation can be performed without any problems.

For example, in the case of an information display device, the operation unit, such as the power button 140, is often disposed on a display side. In the case where an operation unit is disposed on the display unit side, for example, when the operation unit is used for signage, the position of the button is easily understood by the user. However, there is a problem that the power is turned off when the power button is depressed unintentionally (or intentionally). In particular, there are many unmanned patterns in a signage systems, and it is necessary to avoid the unintentional (or intentional) power-off patterns described above.

The information display device 100 according to the present embodiment is positioned on the side of the information display device 100 by the operation unit including the power button 140, so that the position of the power button 140 is not known from the front. It is also possible to prevent unintentional (or intentional) pressing of the power button and turning the power off. Further, the bezel width of the frame portion 115 can be narrowed by placing an operation unit including the power button 140 on the side of the information display device 100. The information display device 100 of this embodiment aggregates the interface portions 190 into one side (the bottom side surface 124). Depending on the position of the interface portions 190, the attitude during the installation may be limited. For example, the problem is that if the interfaces are arranged in multiple locations, the installation constraints increase. The information display device 100 according to the present embodiment, which is layout-free (it is possible to select a stand, a wall, a flat position, or the like), can be installed without any limitation by aggregating the interface portions 190 on one side.

In a conventional information display device, the operation buttons operated by the user are often mounted on the same side as the display (=the same side as the display surface) in consideration of the user's ease of use.

On the other hand, power source connectors and battery switches for connecting power cords are usually not frequently used, so they are often arranged on a surface that is different from the display surface. In the conventional information display device, there are many structures in which the interfaces used by the user are arranged in conformity with the frequency of the operations for use. When a display attitude is determined and a fixed installation is major usage in the display device, this interface arrangement may be effective. However, in the case of portable, freely carried display devices, the user has difficulty in finding where the interface exists.

The information display device 100 according to this embodiment aggregates the interface portions 190 to one side, thereby making the location of the interface easier to understand.

Further, the interface portion 190 is concentrated on the bottom side surface 124 of the bottom side frame portion 1154 having a wide bezel width of the frame portion 115, thereby making the location of the interface easier to understand.

Modification

In the information display device 100 according to this embodiment, the position of the power button may be displayed on the information display part 110 at a predetermined timing. By displaying the position of the power button on the information display part 110 at a predetermined timing, the position of the operation unit can be easily noticed by the user. The information display device according to the above described embodiment includes an information display unit that displays information on a screen parallel to an XY plane at Z0 when the information display unit is disposed in a range of X0 to XM, YM to YM, and Z0 to ZM of virtual three-dimensional coordinates made of XYZ axes that are orthogonal to each other, a housing having a first side at X0, a second side at YM, a third side at XM, and a fourth side at Y0, wherein the housing includes an operation unit operated by the user on the fourth side, a data communication unit including a connector for communicating with an external device, and a power source connecting portion including a power source connector for externally supplying power.

The information display further includes a battery, wherein the housing includes a battery insertion portion on the fourth side at which the battery is attached and detached. The information display device further includes an infrared sensor for detecting an adjacent information display device, wherein the infrared sensor is provided on a side that is different from the fourth side. In the information display device, the plurality of infrared sensors are provided on all sides other than the fourth side. In the information display device, the information display unit includes a plurality of frame portions around the screen, and the fourth side is a side adjacent to the widest frame portions from among the frame portions.

The present invention is not limited to the configuration illustrated in the above-described embodiments, such as a combination of the above-described embodiments and other elements. These points can be modified without departing from the spirit of the present invention, and can be appropriately determined according to the application.

Effects of the Invention

According to an information display device of the present disclosure, the user can easily recognize the location of the interface and improve the operability.

DESCRIPTION OF SYMBOLS

100 Information display device
110 Information display part
115 Frame
120 Housing
121 Right side surface
122 Top side surface
123 Left side surface
124 Bottom side surface
128 Battery insertion portion
130 Infrared sensor window
131 Infrared sensor window
132 Infrared sensor window
133 Infrared sensor window
140 Power button
150 Communication connector
160 Card connector cover
170 Power source connector
180 Battery
190 Interface portion
1151 Right side frame portion
1152 Top side frame portion
1153 Left side frame portion
1154 Bottom side frame portion All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information display device has been described in detail, it should be understood that various changes, substitutions, and alterations could be made thereto without departing from the spirit and scope of the invention.

The order of the method of the embodiment of the present invention is not limited to the order of processes of the method disclosed by this disclosure.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information display device comprising:
   an information display part including a screen for displaying information; and
   a housing including a plurality of sides surrounding the screen, the information display part being attached to the information display device, wherein
   a first side of the housing from among the plurality of sides, is provided with
     an operation unit that receives an operation for the information display device;
     a connector that communicates with an external device; and
     a power source connecting portion that has a power source connector, to which power is supplied from an outside, and
   at least one second, side of the plurality of sides is provided with
     a sensor configured to transmit or receive information with an adjacent information display device,
   the at least one second side is a different side of the plurality of sides from the first side and is provided at a surface different from a surface where the screen is disposed,
   the housing includes a bezel that surrounds a periphery of a front surface of the screen,
   the bezel includes
     a first portion that extends from the first side of the housing to the periphery of the front surface of the screen directly adjacent to the first side, and
     a second portion that extends from each side of the housing among the plurality of sides, other than the first side, to the periphery of the front surface of the screen directly adjacent to a corresponding side, a first width of the first portion of the bezel is greater than a second width of the second portion of the bezel, and
   the information, display device is configured f the housing other than the first side, to an adjacent information display device, such that the first side of the housing is aligned with a first side of the adjacent information display device.

2. The information display device according to claim 1, the information display device further comprising:
   a battery,
   wherein the housing includes a battery insertion portion for attaching and detaching the battery on the first side of the housing.

3. The information display device according to claim 1, the information display device further comprising:
the sensor is an infrared sensor that is further configured to detect an adjacent information display device.

4. The information display device according to claim 3, wherein the infrared sensor includes a plurality of infrared sensors, the plurality of infrared sensors being provided on all sides other than the first side.

5. The information display device according to claim 1, wherein
the information display part includes a plurality of frame portions around the screen, and
the first side is a side adjacent to a frame portion having a widest width from among the plurality of frame portions.

6. The information display device according to claim 1, wherein the information display device and the adjacent information display device are coupled to display a single composite image.

7. The information display device according to claim 1, wherein
the information transmitted or received by the sensor includes positioning information of the information display device relative to the adjacent information display device, and
in a case where the information display device and the adjacent information display device are coupled to display a single composite image, the information display device determines a portion of the single composite image to be displayed on the screen based on the positioning information.

* * * * *